(12) United States Patent
Pitiot et al.

(10) Patent No.: US 9,133,790 B2
(45) Date of Patent: Sep. 15, 2015

(54) AIRCRAFT PROPULSION SYSTEM PROVIDED WITH REVERSE THRUST MEANS

(75) Inventors: Ingrid Pitiot, Montigny-le-Bretonneux (FR); Nicolas Dezeustre, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 13/640,070

(22) PCT Filed: Mar. 10, 2011

(86) PCT No.: PCT/FR2011/050483
§ 371 (c)(1),
(2), (4) Date: Oct. 9, 2012

(87) PCT Pub. No.: WO2011/124793
PCT Pub. Date: Oct. 13, 2011

(65) Prior Publication Data
US 2013/0025260 A1    Jan. 31, 2013

(30) Foreign Application Priority Data
Apr. 9, 2010 (FR) ...................................... 10 52689

(51) Int. Cl.
*F02K 1/70* (2006.01)
*F02K 1/64* (2006.01)
*F02K 1/72* (2006.01)

(52) U.S. Cl.
CPC ... *F02K 1/70* (2013.01); *F02K 1/64* (2013.01); *F02K 1/72* (2013.01); *Y02T 50/671* (2013.01)

(58) Field of Classification Search
CPC ............................ F02K 1/32; F02K 1/54–1/72
USPC .......... 60/226.2, 230, 226.3, 232; 244/110 B; 239/265.29, 265.19, 265.25, 265.31, 239/265.33
See application file for complete search history.

(56) References Cited

U.S. PATENT DOCUMENTS

| 3,040,524 A | 6/1962 | Alexander |
| 3,747,341 A * | 7/1973 | Davis ........................... 60/226.2 |

(Continued)

FOREIGN PATENT DOCUMENTS

| EP | 1609719 A1 | 12/2005 |
| FR | 2021435 A1 | 7/1970 |
| FR | 2120172 A1 | 8/1972 |

OTHER PUBLICATIONS

International Search Report issued May 3, 2011 re: PCT/FR2011/050483; citing: US 5,315,821 A, FR 2 120 172 A1, EP 1 609 719 A1, US 4,030,291 A, US 3,040,524 A, US 4,030,290 A and FR 2 021 435 A1.

*Primary Examiner* — Ehud Gartenberg
*Assistant Examiner* — Jason H Duger
(74) *Attorney, Agent, or Firm* — Brinks Gilson & Lione

(57) ABSTRACT

A propulsion system has a nacelle, and inside this nacelle, a dual flow turbojet engine includes a fan case in which are located a fan and an assembly of fixed flow-rectifying vanes. This propulsion system includes a thrust inverter located between the fan and the assembly of the fixed flow-rectifying vanes. In particular, the thrust inverter includes a plurality of windows formed in the fan case and thrust inversion flaps to send back the secondary airflow toward the outside and toward the front of the nacelle, through the windows. The thrust inversion flaps pivotally move between a normal operating position in which they allow the passage of the secondary airflow and block the windows, and a thrust inversion position in which they block the passage and clear the windows.

3 Claims, 7 Drawing Sheets

(56) References Cited

U.S. PATENT DOCUMENTS

| | | | |
|---|---|---|---|
| 3,946,554 A * | 3/1976 | Neumann | 60/204 |
| 4,030,290 A | 6/1977 | Stachowiak | |
| 4,030,291 A | 6/1977 | Sargisson | |
| 5,315,821 A * | 5/1994 | Dunbar et al. | 60/226.1 |
| 5,706,649 A * | 1/1998 | Robinson et al. | 60/226.2 |
| 6,557,338 B2 * | 5/2003 | Holme et al. | 60/226.2 |
| 7,469,528 B2 * | 12/2008 | Lardellier | 60/204 |
| 2009/0314887 A1 * | 12/2009 | Aten et al. | 244/110 B |

* cited by examiner

AIRCRAFT PROPULSION SYSTEM PROVIDED WITH REVERSE THRUST MEANS

TECHNICAL FIELD

The present invention relates to an aircraft propulsion system provided with reverse thrust means.

BRIEF DESCRIPTION OF RELATED ART

Propulsion systems of the type comprising a nacelle and inside this nacelle a turbojet engine are known from the prior art.

More particularly, such systems are known, in which the turbojet engine is a dual flow engine: a so-called <<primary>> or <<hot>> flow flowing inside the engine of the turbojet, and a so-called <<secondary>> or <<cold>> flow, flowing at the periphery of this engine, in a vein delimited by the outer case of this engine on the one hand and by the internal wall of the nacelle on the other hand.

Both of these airflows are divided downstream from the fan of the turbojet engine, so as to return to said engine and said vein respectively.

Generally, the thrust of the turbojet engine is for a major part ensured by the secondary flow.

Also, an effective means for braking upon landing consists of diverting at least one portion of this secondary flow towards the front of the aircraft: for this, so-called thrust inversion means are used, well known per se.

As a rule, these thrust inversion means which are of the type with doors (opening of pivoting doors towards the outside of the nacelle allowing the secondary flow to be diverted forwards) or with grids (sliding panels exposing grids for diverting the secondary flow forwards), located downstream from the case of the fan of the turbojet engine, in a portion of the nacelle specifically designed for incorporating these inversion means.

This specific portion of the nacelle has a significant weight because of all the fixed and mobile thrust inversion units which it incorporates, and it necessarily induces a significant overall nacelle length.

BRIEF SUMMARY

The disclosure is directed notably to suppress these drawbacks.

This is achieved with a propulsion system of the type comprising a nacelle and, inside this nacelle a dual flow turbojet engine itself comprising a fan case in which are located a fan and an assembly of flow-rectifying vanes, this propulsion system being remarkable in that it comprises thrust inversion means located between said fan and said vane assembly.

By these features, it is possible to do without a specific thrust inverter structure downstream from the fan case, which allows simplification of the whole of the nacelle and reduction of its overall length.

According to other optional features of the propulsion system according to the invention:
  said thrust inversion means comprise a plurality of windows formed in said fan case, between said fan and said rectifying vanes, and means for sending back the secondary airflow towards the outside and towards the front of the nacelle, through said windows;
  said means for sending back the secondary air flow comprise so-called flow-rectifying vanes, moveable between a normal operating position in which they allow passage of the secondary airflow and a thrust inversion position in which they prevent this passage;
  said flow-rectifying vanes are each mounted so as to pivot around a substantially radial axis;
  said means for sending back the secondary airflow further comprise a plurality of grids for diverting the secondary airflow distributed between said fan case and the outer skin of said nacelle, facing said windows, and inner panels moveable between a normal operating position, in which they ensure aerodynamic continuity along said case and a thrust inversion position in which they allow the airflow to circulate through said diverting grids;
  said inner panels are slideably mounted on said case between a position where they obturate said windows, and a position where they clear these windows: this sliding operation of the inner panels is very simple and is compatible with the space available between the fan case and the outer skin of the nacelle;
  said means for sending back the secondary air flow comprise thrust inversion flaps, pivotally mounted on said fan case upstream from said rectifying vanes, between a normal operation position in which they allow the passage of secondary airflow and obturate said windows and a thrust inversion position in which they prevent this passage and clear said windows;
  said means for sending back the secondary airflow comprise outer panels arranged facing said windows, pivotally mounted on the outer skin of said nacelle between a substantially tangential closing position and a substantially radial opening position: these outer panels thus operate like laths of a shutter and their joint actuation may be achieved very simply, for example by a rotary annular ring;
  said outer panels are suitable for ensuring diversion of the secondary air flow: in this way it is possible to do without diverting grids separated from these outer panels, which is extremely advantageous in terms of weight and of simplification of the structure; it is to be noted that it is also possible to contemplate association with these outer panels of any other means for diverting the secondary airflow, such as deflectors of suitable shape mechanically coupled or firmly attached to these outer panels;
  said means for sending back the secondary airflow comprise doors positioned upstream from rectifying vanes, which may pivot towards the outside of the nacelle.

BRIEF DESCRIPTION OF THE DRAWINGS

Other features and advantages of the present invention will become apparent in the light of the description which follows, and upon examining the figures appended herein, wherein.

DETAILED DESCRIPTION

On the whole of these figures, an XYZ reference system is illustrated, the directions of which conventionally represent the longitudinal, transversal and vertical directions of the aircraft with which the propulsion system which will be described, is intended to be associated.

Figure 1:
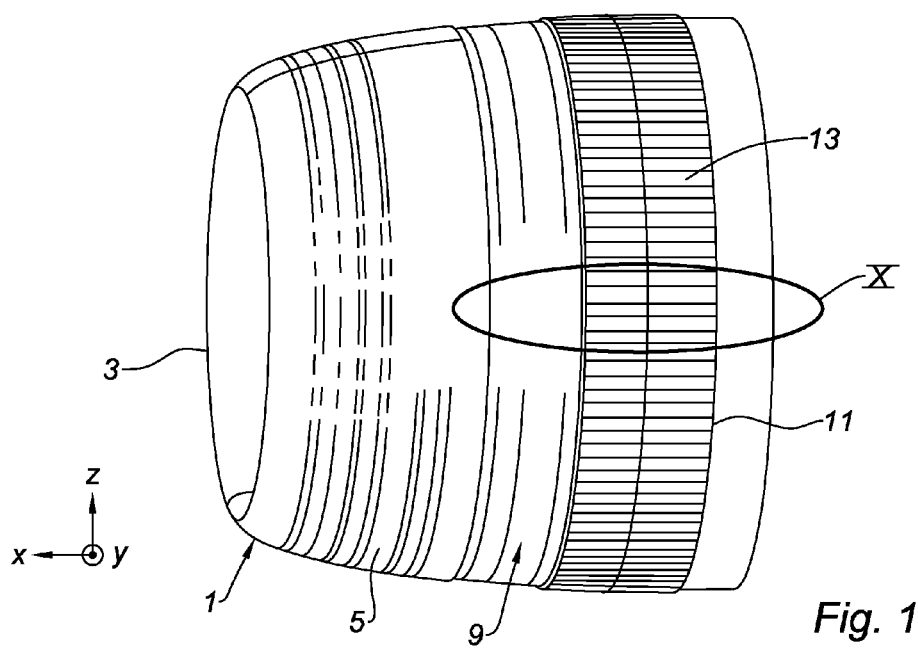
FIG. 1 illustrates as a perspective view, the outside of the upstream portion of a propulsion system according to the invention, in a flight configuration (direct jet)
Figure 2:
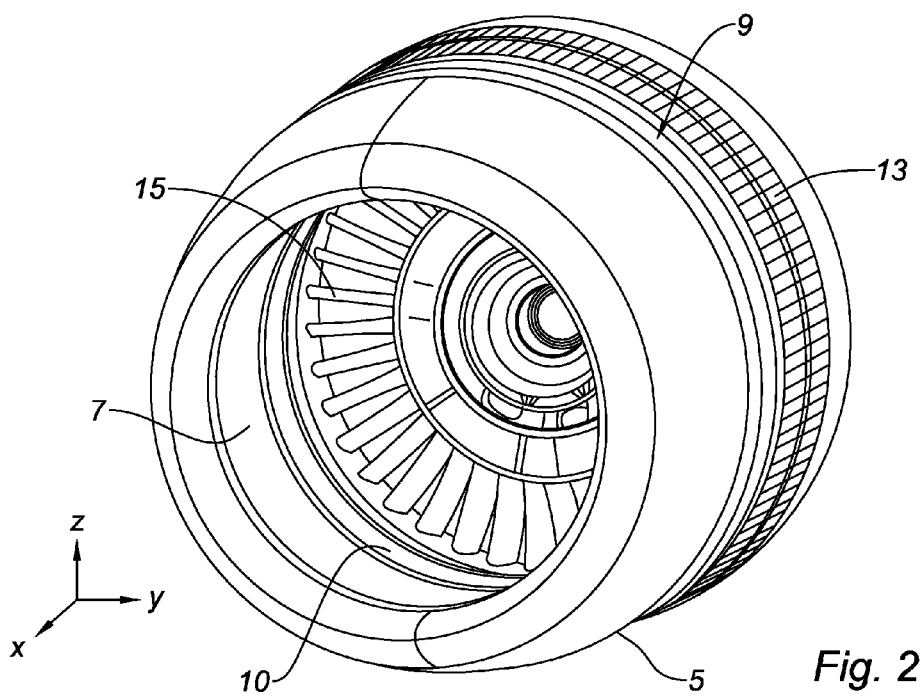
FIG. 2 illustrates as a perspective view, the inside of this upstream portion, the fan having been removed, FIG. 3, similar to FIG. 1, illustrates this upstream portion in a thrust inversion configuration.

Reference is now made to FIGS. 1 and 2, wherein the upper portion of a propulsion system according to the invention is illustrated.

This upstream portion comprises an air intake 1 provided with an air intake lip 3 intended to channel the outside air towards the engine (not shown) of a propulsion system according to the invention.

On its outer face, the air intake lip 3 is extended downstream with an air intake outer skin 5, and on its inner face, conventionally with an acoustic absorption structure 7, such as a honeycomb structure.

Figure 3:
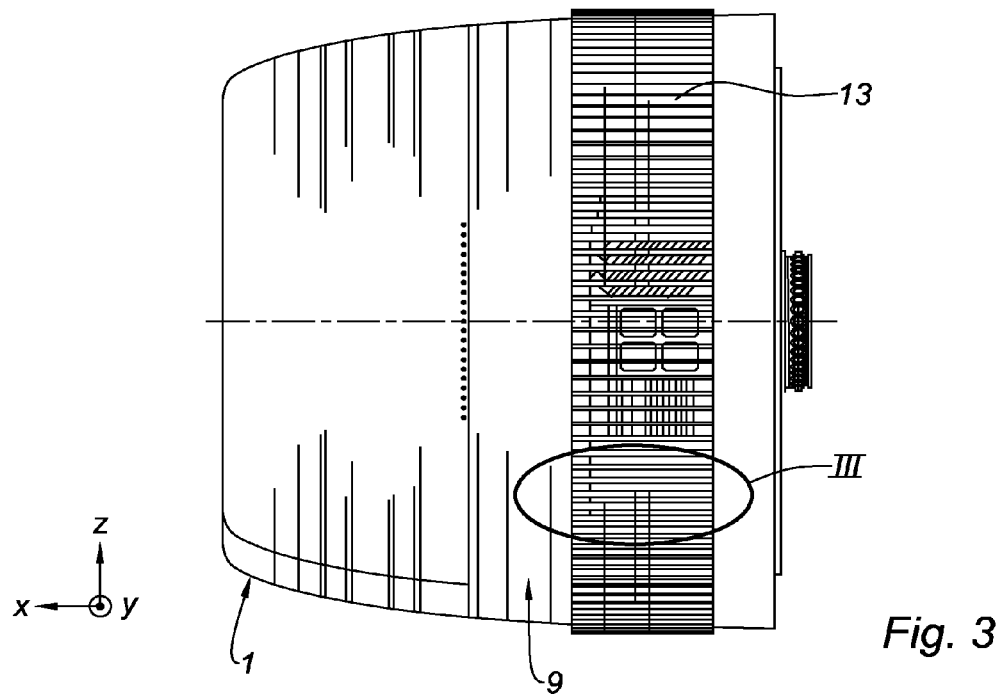
Figure 4:
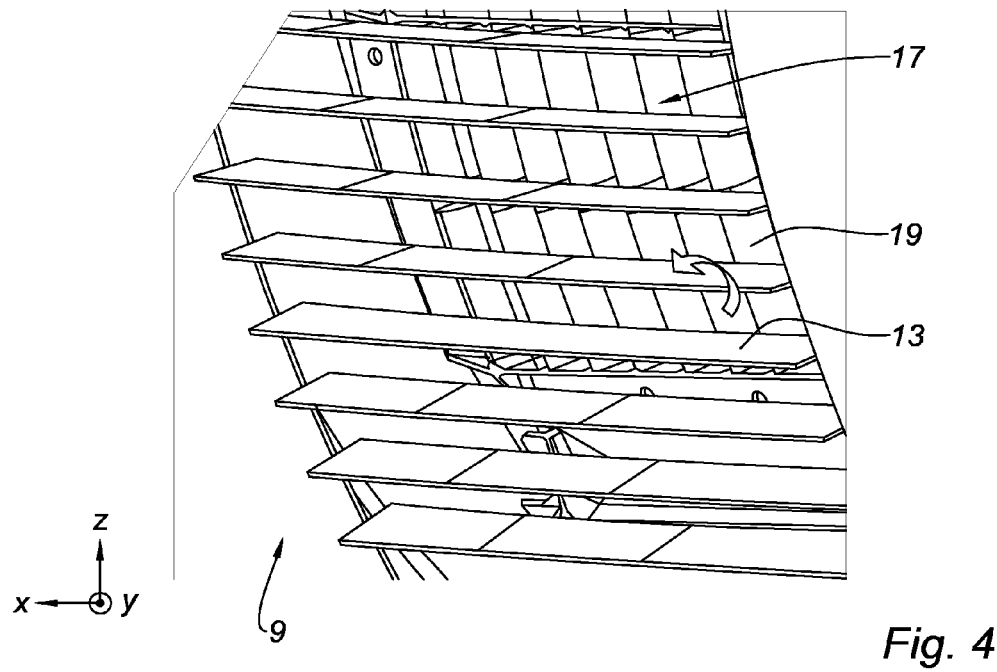
FIG. 4 represents as a perspective view, a detailed view of the area III of the assembly illustrated in FIG. 3, FIG. 5, similar to FIGS. 1 and 3, illustrate said assembly after removal of its outer skin.

The outer skin 5 of the air intake 1 is extended downstream with a fan cowl 9 provided with an annular aperture 11 between both edges of which is mounted an assembly of outer panels 13, each pivoting around an axis between a closed position visible in FIGS. 1 and 2, and an open position visible in FIGS. 3 and 4.

Inside the air intake 1, the acoustic absorption elements 7 are extended downstream with a fan case 10, a kind of cylindrical ferrule inside which the fan of the engine is rotatably mounted (this fan having been removed in FIG. 2 for facilitating explanations).

Downstream from the position which the fan should occupy, and always inside the fan case 10, flow-rectifying vanes (OGVs) 15 are positioned, which generally are fixed, but which, according to a first embodiment of the invention, are each pivotally mounted around substantially radial axes.

As this is visible in FIG. 4, when the outer panels 13 are in an open position, they allow air to circulate towards the outside of the nacelle.

Figure 5:
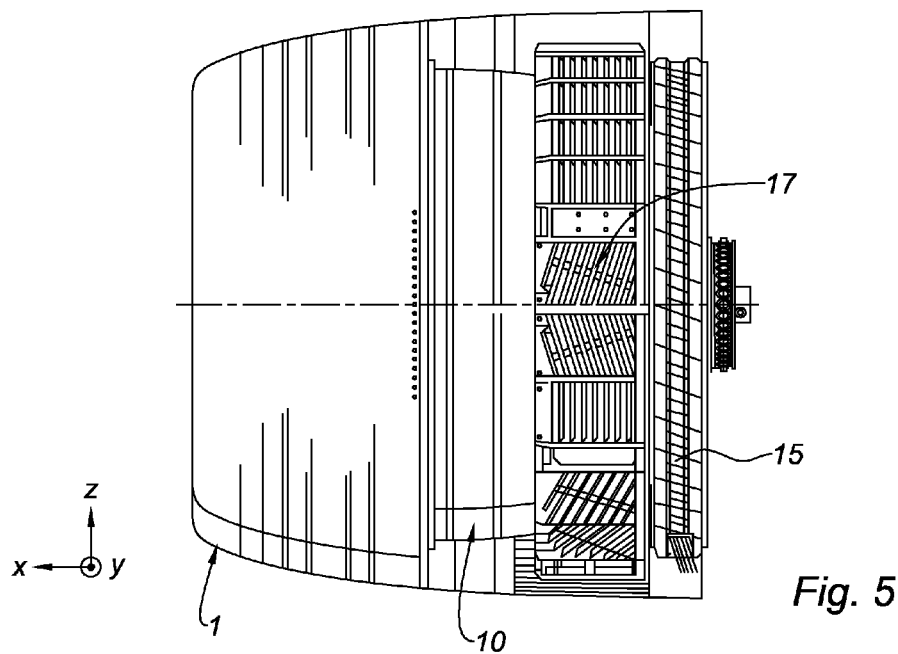

As this is visible in FIG. 5, where the fan case cowl 9 has been removed for explanatory purposes, possible diverting grids 17 are positioned substantially regularly over the whole periphery of the fan case 9.

These grids are said to be <<optional>> since, as this will be explained later on, it is possible to contemplate alternatives in which these grids are omitted.

Each of the optional diverting grids 17 includes blades 19 oriented so as to be able to send back outwards and towards the front of the air intake 1, the so-called secondary airflow driven by the fan and circulating in a substantially annular air vein positioned around the engine (not shown) of the turbojet of the propulsion system according to the invention.

As this is visible in FIG. 5, the optional diverting grids 17 are arranged upstream from the flow-rectifying vanes 15.

Figure 6:
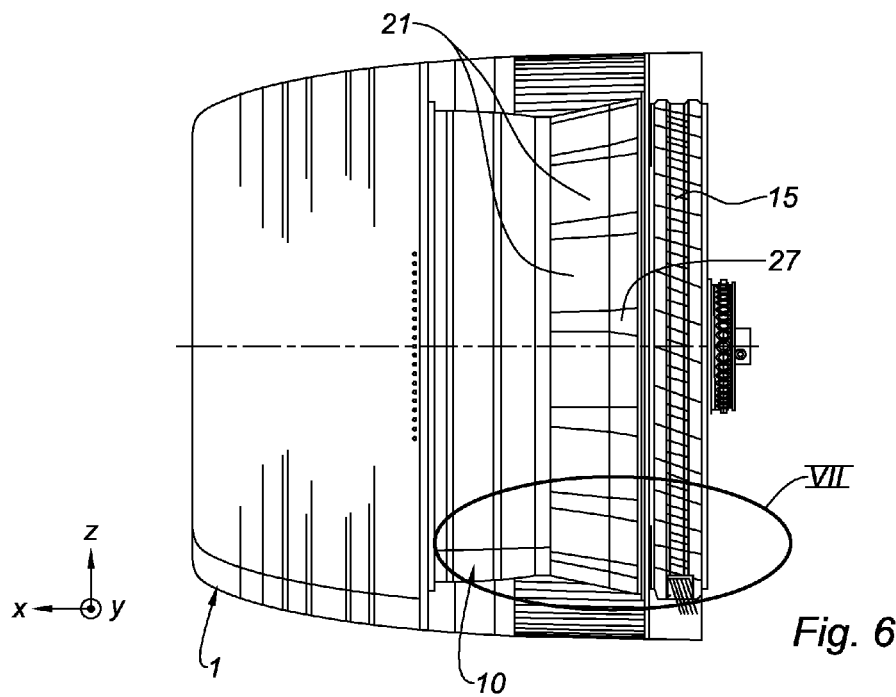
FIG. 6 illustrates this same assembly after removal of the thrust inversion grids.

Reference is now made to FIG. 6, which is inferred from 5 by removing the optional diverting grids, for explanatory purposes.

As this is visible in this FIG. 6, in its portion located just upstream from the flow-rectifying vanes 15, the fan case 10 includes over the whole of its periphery a set of windows 23 which may be obturated by inner panels 21.

In the closed position illustrated in FIG. 6, corresponding to a normal operating situation (in flight—<<direct jet>>) of the propulsion system according to the invention, each panel 21 is located under an optional respective diverting grid 17.

Figure 7:
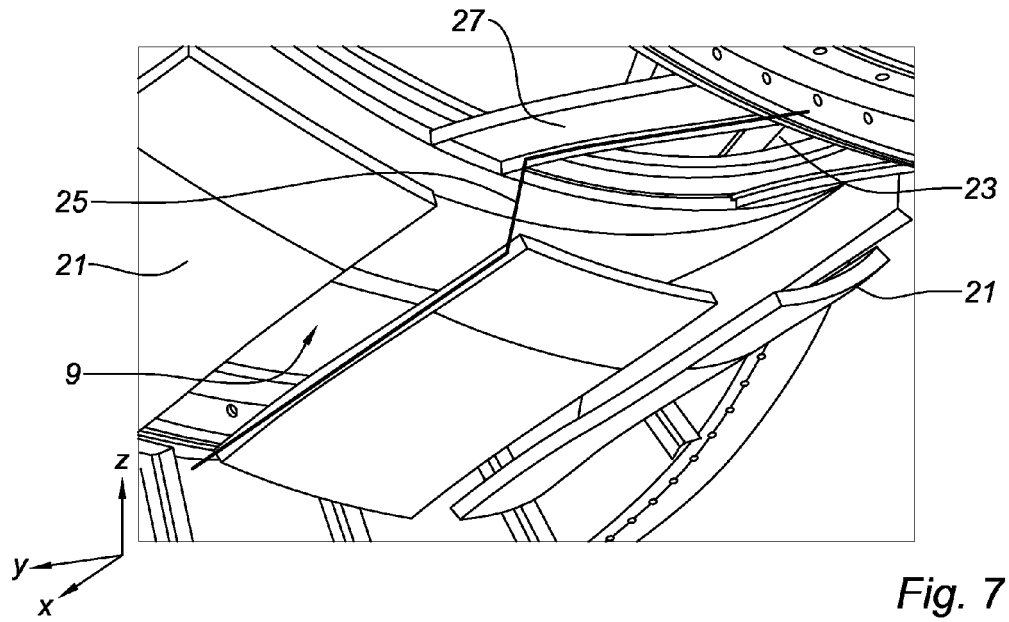
FIG. 7 illustrates a detailed view of the area VII of FIG. 6, corresponding to a thrust inversion configuration, FIG. 8 which is a detailed view of the area VIII of FIG. 9, illustrates the flow-rectifying vanes of the aforementioned assembly, during rotation towards their obturation position.

In the thrust inversion position, each panel 21 slides towards the front of the fan case 10, by suitable rail/slide means, so as to reach the position visible in FIG. 7, in which the windows 23 located under each optional diverting grid 17 are cleared.

More particularly, the travel of each inner panel 21 is illustrated by the line 25 of FIG. 7, this travel may be obtained by means of rails positioned on fixed members 27 separating the windows 23 from each other. The position of the rails is indicative and may for example be used for ensuring the closing of the front area between the secondary airflow vein and the outer skin of the nacelle.

Figure 8:
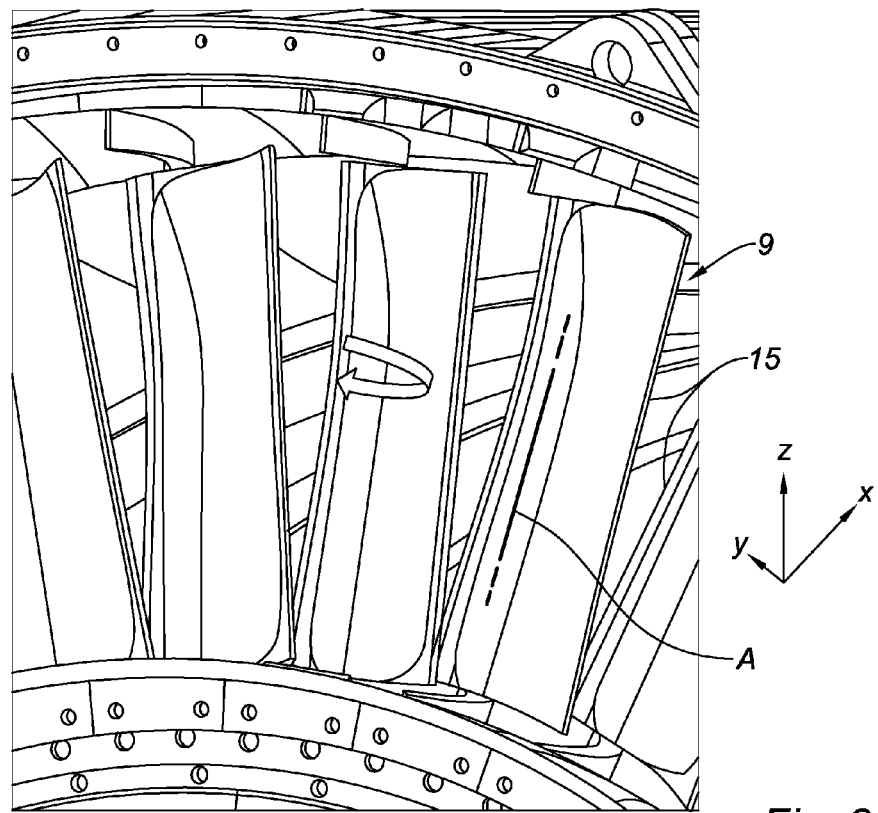
Figure 9:
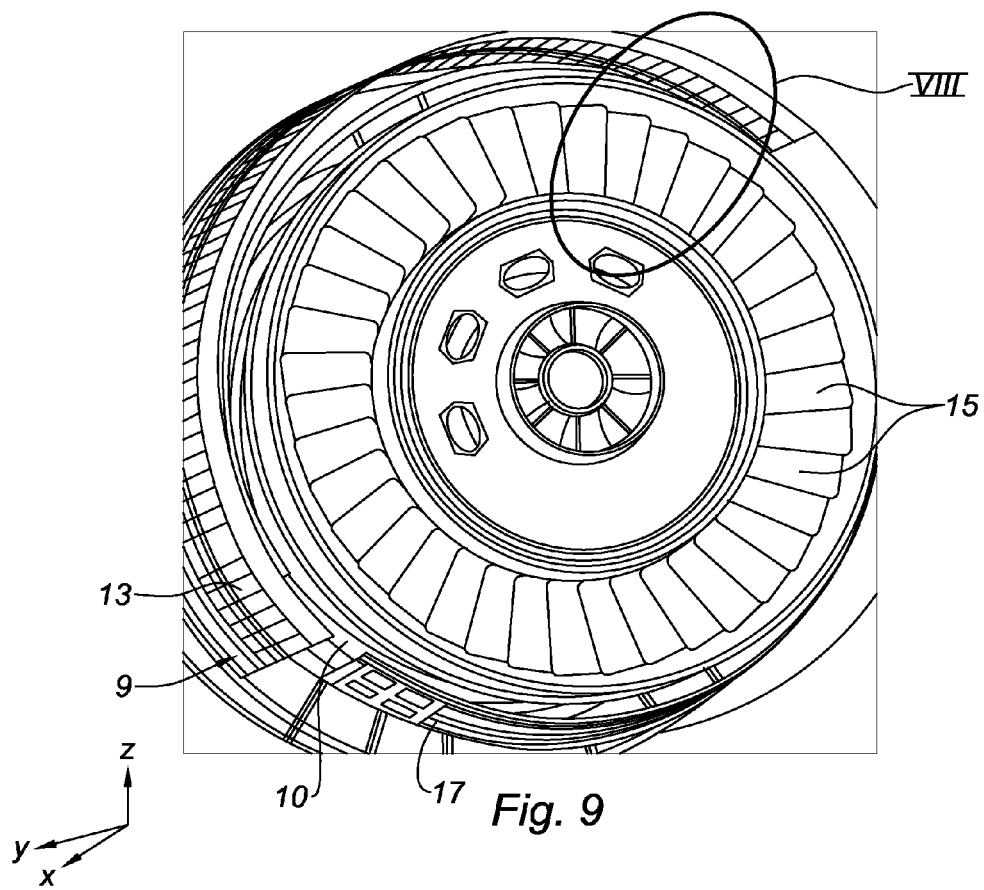
FIG. 9 is a perspective view taken from the rear of the aforementioned assembly, the flow-rectifying vanes being illustrated in an obturation position.

Referring now to FIGS. 8 and 9, it is possible to see that each vane 15 may therefore, by pivoting around an associated substantially radial axis A, pass from a normal operating position, in which these vanes allow passage of the secondary airflow blown by the fan, to an obturation position, visible in FIG. 9, in which these vanes 15 are substantially joined, and thereby prevent passage of said secondary airflow.

Figure 10:
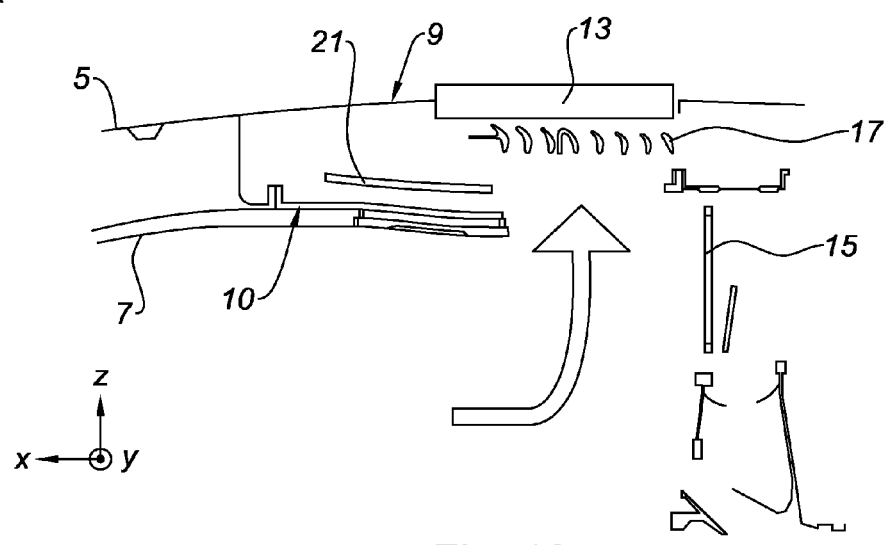
FIG. 10 is an axial sectional view of the detailed area X of the assembly of FIG. 1, this assembly is found in the thrust inversion configuration, FIG. 11, similar to FIG. 6, illustrates another embodiment of an assembly according to the invention, in a flight configuration (direct jet)

In FIG. 10, it is possible to see the whole of the aforementioned members in the thrust inversion position: the outer panels 13 have pivoted towards their open position, like the laths of a shutter; the inner panels 21 have slid towards the front of the fan case 9, thereby clearing the windows 23, and the flow-rectifying vanes 15 have pivoted towards their obturation position.

The operating mode of the propulsion system, the upstream portion of which has just been described, directly results from the preceding explanations.

In normal operating mode, i.e. apart from landing situations, the outer panels 13 and the flow-rectifying vanes 15 are in the position illustrated in FIGS. 1 and 2.

The inner panels 21 are found in the closing position illustrated in FIG. 6.

In this configuration, the air blown by the fan (not shown) passes through the flow-rectifying vanes 15, joins up with the operating air vein, and is ejected downstream from the propulsion system according to the invention, thus allowing propulsion of the aircraft (a so-called <<direct jet>> configuration).

Closing of the outer panels 13 ensures aerodynamic continuity of the fan cowl 9, and closing of the inner panels 21 ensures aerodynamic continuity inside the fan case 10.

During the landing of the aircraft, when braking is desirably optimized, the secondary airflow should be directed towards the front of the propulsion system.

To do this, the outer panels 13 and the inner panels 21 are placed in the opening position, as this is illustrated in FIGS. 3, 4 and 10.

Moreover the flow-rectifying vanes 15 are placed in their obturation position, as this is visible in FIG. 9.

By doing this, circulation of the secondary airflow towards its associated vein is prevented and it is directed through the optional diverting grid 17 and therefore towards the outside and towards the front of the propulsion system, because of the suitable orientation of the blades 19.

As this will have been understood in the light of the preceding description, the propulsion system which has just been described gives the possibility of shifting the thrust inversion device, upstream from the flow rectifying vanes, which gives the possibility of doing without a conventional inversion device, positioned upstream from these vanes: in this way it is possible to substantially reduce the longitudinal bulkiness of the propulsion system and to obtain a significant gain in weight.

Further, the distribution of the thrust inversion system over the whole periphery of the propulsion system gives the possibility of retaining remarkable balancing of the forces in play during the thrust inversion phases, thereby guaranteeing less fatigue for the whole of the relevant parts.

Of course, the present invention is by no means limited to the described and illustrated example, given only as an illustration.

For example in this way it is possible to contemplate an alternative in which the outer moveable panels 13 would fulfill the function of the optional diverting grid 17: in this way it would be possible to do without these grids, the deviation of the secondary airflow for thrust inversion being then ensured by these panels 13 themselves placed in an open position.

Further, it is possible to contemplate another embodiment of the invention, as described in FIGS. 11 to 15.

Figure 13:
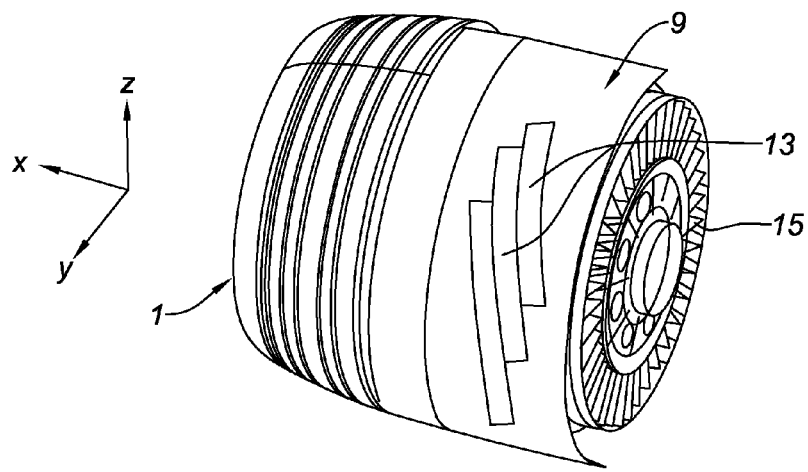
Figure 14:
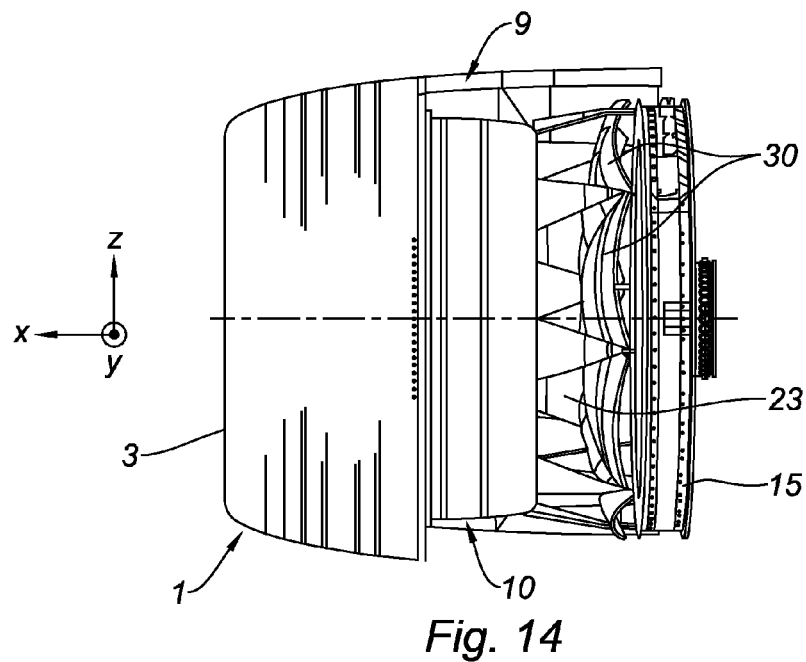
Figure 15:
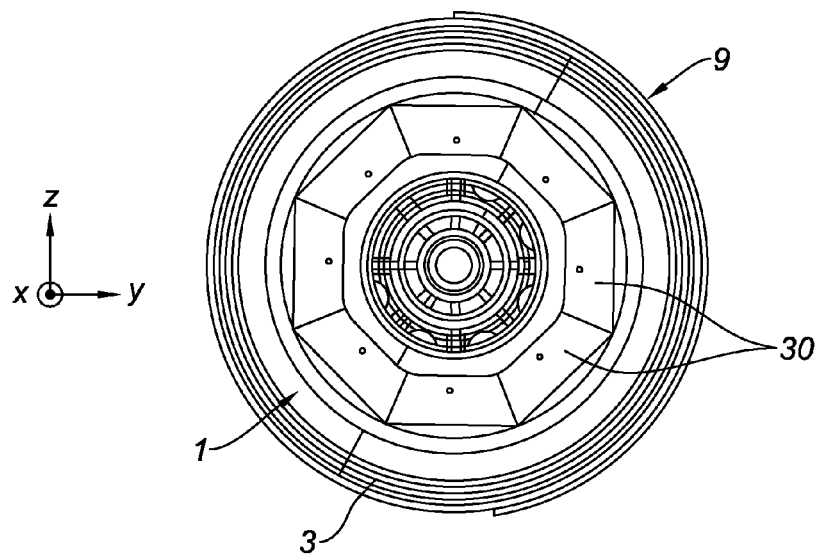
FIG. 15 is a view similar to that of FIG. 4, showing another possible arrangement of the outer panels positioned on the outer skin of the nacelle.

In this other embodiment, the flow-rectifying vanes 15 may be fixed, and the blocking of the secondary airflow is accomplished by flaps 30 (see FIGS. 11, 14 and 15) positioned upstream from these vanes, and jointed on the fan case 10 between a flight position (<<direct jet>>) in which they obturate the windows 23 (see FIGS. 11, 12 and 13), and a thrust inversion position in which they obturate the secondary airflow vein (see FIGS. 14 and 15).

Figure 11:
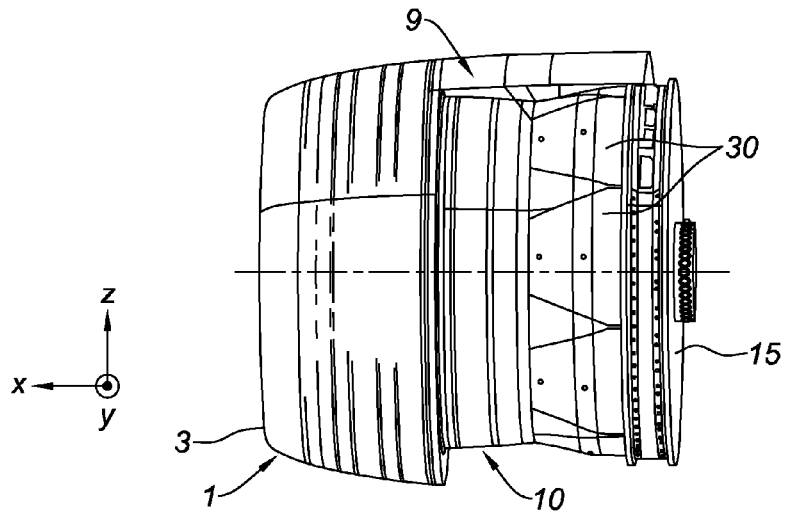
Figure 12:
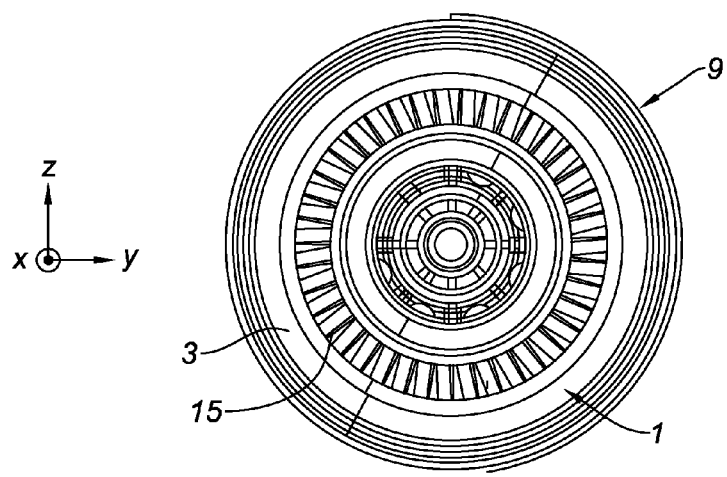
FIG. 12 is a front view of the assembly of FIG. 11, FIGS. 13 and 14 are views similar to those of FIGS. 11 and 12 (the fan having been removed for facilitating explanations), the assembly being illustrated in the thrust inversion configuration.

Although this has not been illustrated in FIGS. 11 and 14, for the sake of clarity, it should obviously be understood that optional diverting grids facing the windows 23 are found similar to the grids 17 of the previous embodiment.

It should be noted that it is possible to provide, notably for this embodiment, that the outer moveable panels 13 jointed on the fan cowl 9 like the laths of a shutter, be positioned as a herringbone, as this is visible in FIG. 13.

Further in another embodiment, not shown, a thrust inversion system with doors positioned between the fan and the flow-rectifying vanes 15 may be contemplated.

The invention claimed is:

1. A propulsion system comprising a nacelle and, inside said nacelle, a dual flow turbojet engine, the nacelle comprising an outer skin extended downstream with a fan cowl, a fan case in which are located a fan, and an assembly of fixed flow-rectifying vanes, said propulsion system comprising:
   thrust inversion means located between said fan and said assembly of fixed flow-rectifying vanes,
   said thrust inversion means comprising outer moveable panels formed in said fan cowl, a plurality of windows formed in said fan case, between said fan and said assembly of fixed flow-rectifying vanes, and means for sending back a secondary airflow toward an outside and toward a front of the nacelle, through said plurality of windows,
   said means for sending back the secondary airflow comprising thrust inversion flaps, pivotally mounted on said fan case upstream from said assembly of fixed flow-rectifying vanes operable between a normal operating position in which said thrust inversion flaps allow a passage of the secondary airflow and obturate said plurality of windows, and a thrust inversion position in which said thrust inversion flaps obturate the passage of the secondary airflow and clear said plurality of windows,
   wherein said outer moveable panels are jointed on said fan cowl at an oblique orientation from upstream to downstream relative to a longitudinal direction of the propulsion system, said outer moveable panels configured to divert the secondary airflow in the thrust inversion position.

2. The propulsion system according to claim 1, wherein said outer moveable panels are positioned facing said plurality of windows, pivotally mounted on said fan cowl of said outer skin of said nacelle between a substantially tangential closing position and a substantially radial opening position.

3. The propulsion system according to claim 2, wherein said outer moveable panels send the secondary airflow back toward the front.

* * * * *